Aug. 6, 1963 T. S. GATES 3,099,882
AUTOMATIC GEAR GAUGING APPARATUS
Filed Feb. 24, 1959 4 Sheets-Sheet 1

INVENTOR.
THOMAS S. GATES
BY
ATTORNEYS

Aug. 6, 1963    T. S. GATES    3,099,882
AUTOMATIC GEAR GAUGING APPARATUS
Filed Feb. 24, 1959    4 Sheets-Sheet 2

INVENTOR.
THOMAS S. GATES
BY
ATTORNEYS

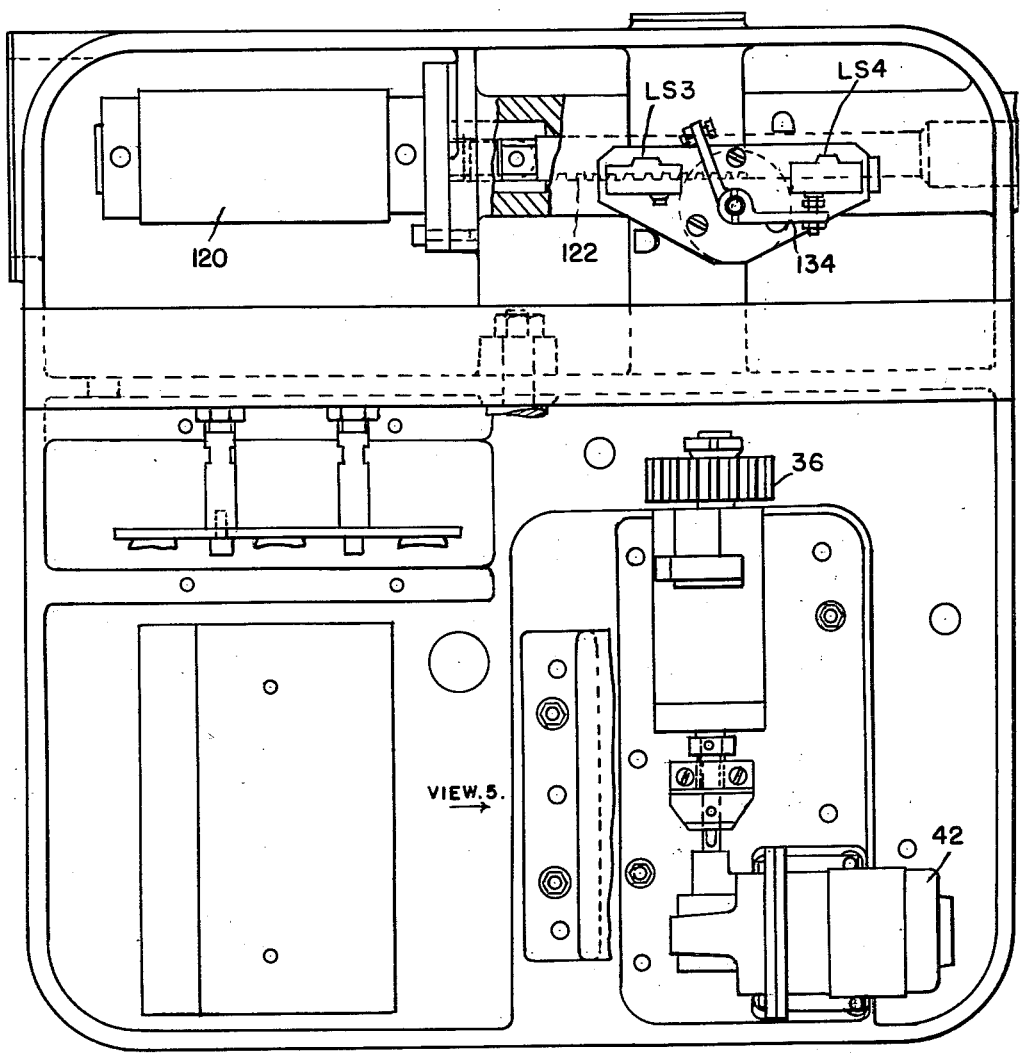

Aug. 6, 1963
T. S. GATES
3,099,882
AUTOMATIC GEAR GAUGING APPARATUS
Filed Feb. 24, 1959
4 Sheets-Sheet 4
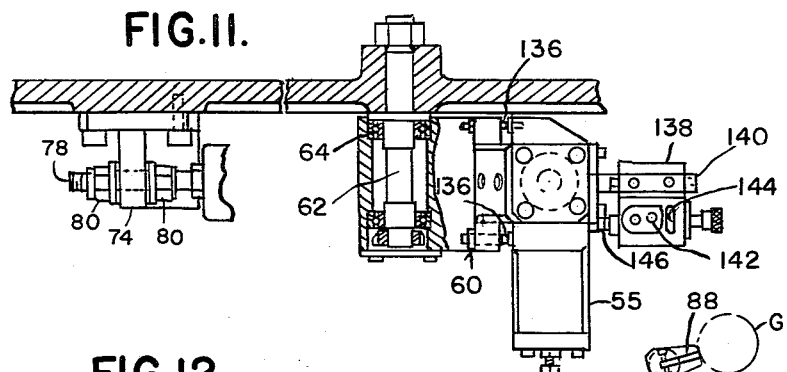
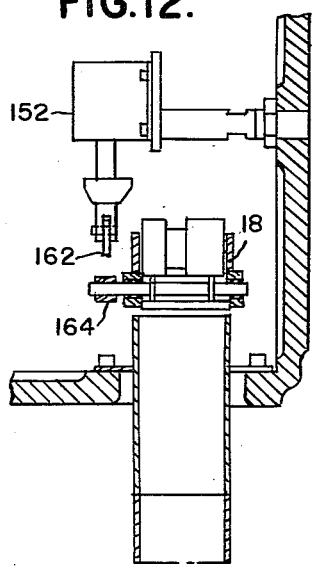
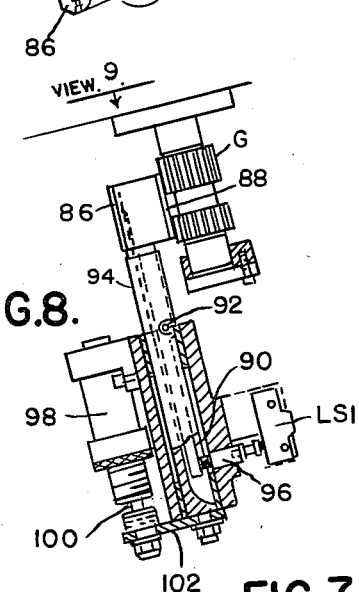
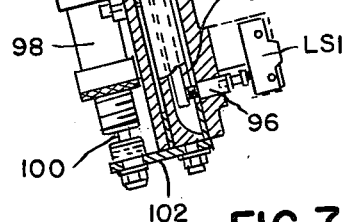
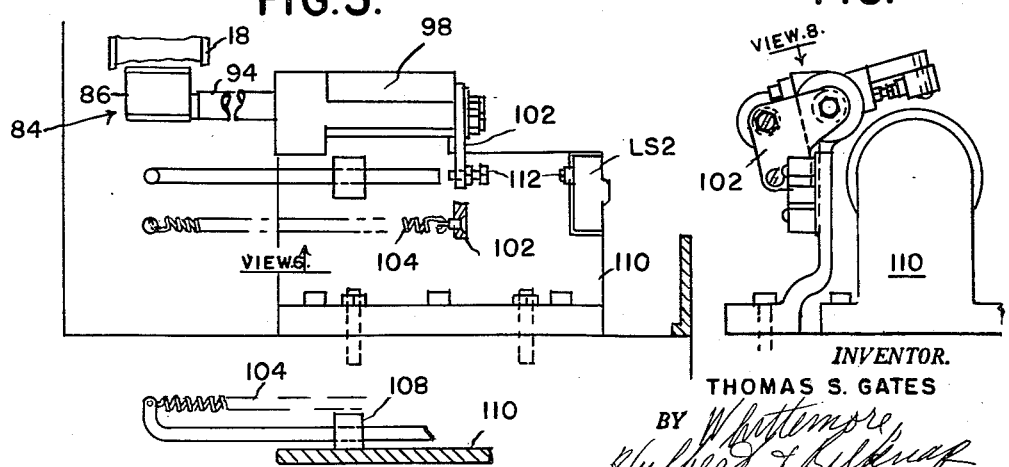
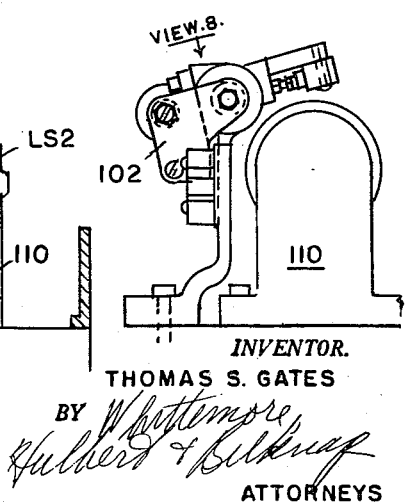
INVENTOR.
THOMAS S. GATES
BY
ATTORNEYS United States Patent Office 3,099,882
Patented Aug. 6, 1963

3,099,882
AUTOMATIC GEAR GAUGING APPARATUS
Thomas S. Gates, Grosse Pointe Woods, Mich., assignor to National Broach & Machine Company, Detroit, Mich., a corporation of Michigan
Filed Feb. 24, 1959, Ser. No. 795,005
4 Claims. (Cl. 33—179.5)

The present invention relates to an automatic gear gauging apparatus.

It is an object of the present invention to provide apparatus effective to gauge the lead or helix angle of a succession of gears in a fully automatic manner and to separate the gauged gears into acceptable gears and two groups of rejected gears, one of which has helix angles greater than acceptable and the other of which has helix angles less than acceptable.

It is a further object of the present invention to provide apparatus as described in the preceding paragraph in which each work gear is mounted for rotation and the lead or helix angle check is carried out completely around the periphery of the gear It is a feature of the present invention to provide lead or helix angle checking apparatus for gears comprising a continuously rotating driving gear, a master gear having its axis generally parallel to the driving gear but spaced somewhat therefrom, means mounting the master gear for movement toward and away from the driving gear and for swivel movement about an axis perpendicular to its axis of rotation.

It is a further feature of the present invention to provide lead checking apparatus comprising guide means for advancing a work gear to a checking zone, a stop element engageable by the gear to retain it approximately in the checking zone, an arbor movable into gear supporting relation while engaged by said stop means, and means for effecting rotation of the gear in the checking zone.

It is a further feature of the present invention to provide lead checking apparatus for a gear comprising a rotatable drive gear, a master gear located adjacent said drive gear with its axis substantially parallel thereto but separated therefrom to permit introduction of a gear to be checked between said drive gear and master gear, brake means opposing rotation of said master gear but effective to be overcome when a work gear has moved fully into the space between the master gear and drive gear, and rotatable gear support means engageable with the gear while positioned in space between said master gear and drive gear effective to move the work gear into a condition of backlash with respect to the drive gear.

Other objects and features of the invention will become apparent as the description proceeds, especially when taken in conjunction with the accompanying drawings, illustrating a preferred embodiment of the invention, wherein:

FIGURE 3 is a plan view of the apparatus with the cover removed and with parts broken away and partly sectioned.

FIGURE 5 is a fragmentary elevational view looking in the direction of the arrow 5, FIGURE 3.

FIGURE 6 is a fragmentary elevational view looking in the direction of the arrow, FIGURE 5.

FIGURE 7 is a fragmentary end elevation of the structure shown in FIGURE 5.

FIGURE 8 is a fragmentary view looking in the direction of the arrow 8, FIGURE 7.

FIGURE 9 is a fragmentary elevational view looking in the direction of the arrow 9, FIGURE 8.

FIGURE 11 is a fragmentary elevational view with parts broken away looking in the direction of the arrow 11, FIGURE 1.

FIGURE 12 is a fragmentary section on the line 12—12, FIGURE 1.

Figure 4:
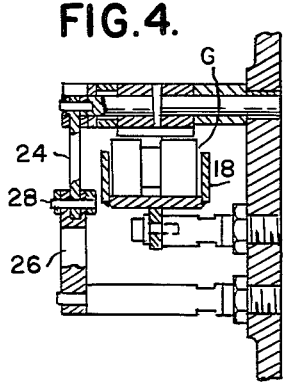
FIGURE 4 is a fragmentary elevational view looking in the direction of the arrow 4, FIGURE 1, with parts in section.

The gear gauging apparatus comprises a housing 10 having a cover 12 hinged as indicated at 14 and adapted to be supported in raised condition by extensible struts 16. The upper portion of the housing 10 includes an inclined chute or trackway indicated generally at 18 along which a series of work gears G advance by gravity. Means are provided for sensing when the supply of gears to be gauged is exhausted and includes a proximity pick up device 20. Gears are released sequentially for a gauging operation by a two-fingered element 22 adapted to be controlled by toggle linkage including an upper link 24 (see FIGURE 4) and a lower link 26 pivoted together as indicated at 28. The upper link is connected to a control lever 30. A piston rod 32 of an air cylinder 34 is connected to the pivot connection 28 of the toggle linkage. The air cylinder preferably has a spring return and is actuated to effect rocking of the release element 22 to release a single gear and retain the remaining gears against advance as will be readily apparent.

The operation performed by the gauging apparatus is a complete 360 degrees' check of the helix angle of the gear. Accordingly, it is necessary to arrest a gear in gauging position and in such position to insure 360 degrees' rotation thereof while its helix angle is gauged.

Figure 2:
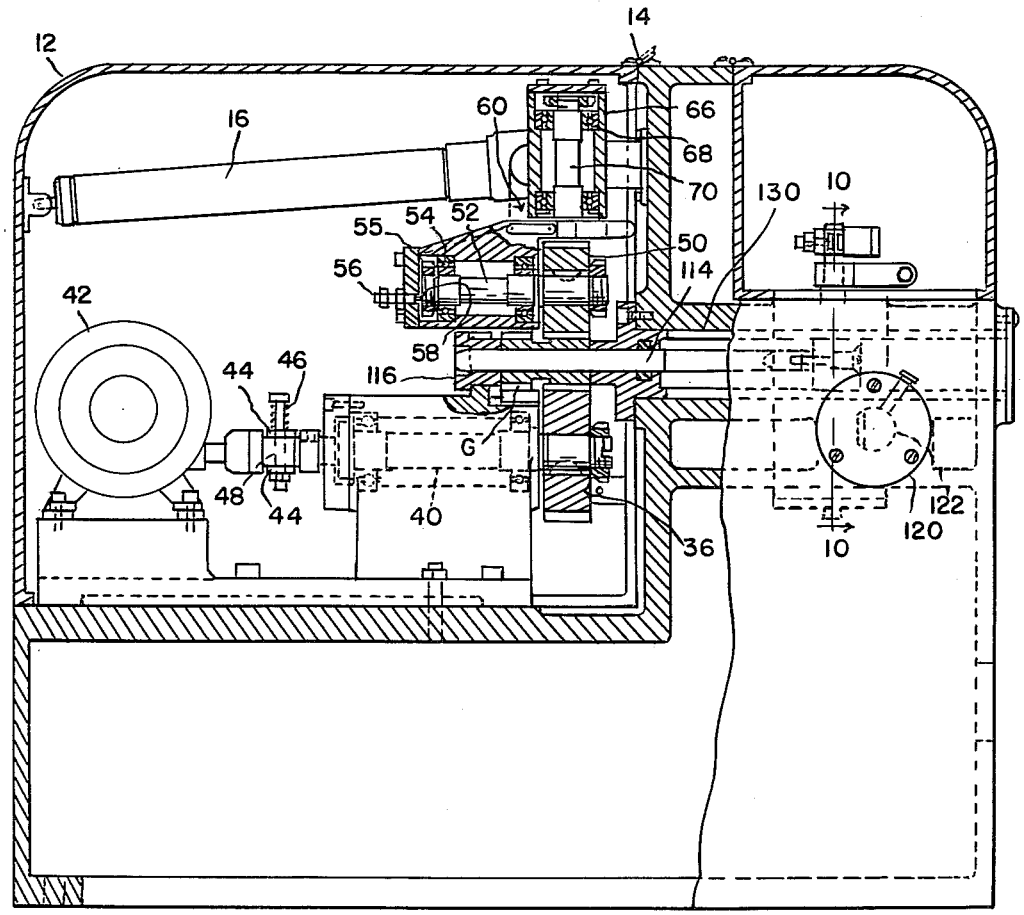
FIGURE 2 is an end view of the gear checking apparatus with portions of the cover removed and with parts in section.

Referring now to FIGURE 2, the gauging apparatus comprises a lower drive gear 36 carried by a shaft 40 which is driven in rotation by a motor 42 through a coupling device comprising a pair of flat plates 44 one of which is urged toward the other by a compression spring 46. Intermediate the flat plates 44 is an end portion 48 of the shaft 40 which is polygonal and preferably square in cross-section. Accordingly, the coupling is adapted to transmit a torque depending upon the strength of the spring 46. When however, sufficient resistance is encountered the plates 44 are cammed apart by the square end section of the shaft. As opposed corners of the square or other polygon pass center, a reverse impulse is imparted to the shaft 40. This will have the effect of tending to induce proper meshing of a work gear if it fails to mesh with the driving gear and master gear upon approach to the operating zone.

Disposed above the driving gear 36 is a master gear 50 which is mounted on a shaft 52. The shaft 52 is mounted in bearings 54 mounted in a swivelled master gear support housing assembly 55. Special means are provided opposing free rotation of the shaft. This means comprises a friction device indicated at 56 which includes a spring (not shown) adapted to urge a pin 58 into engagement with an end of the shaft 52.

The master gear 50 is carried by a pivoted support assembly indicated generally at 60 which is mounted on a stationary stud 62 by bearings 64 as best illustrated in FIGURE 11. The assembly 60 as shown in FIGURE 2 includes a bearing housing 66 which includes bearings 68 supporting a shaft 70 which carries the master gear support housing 55.

Figure 1:
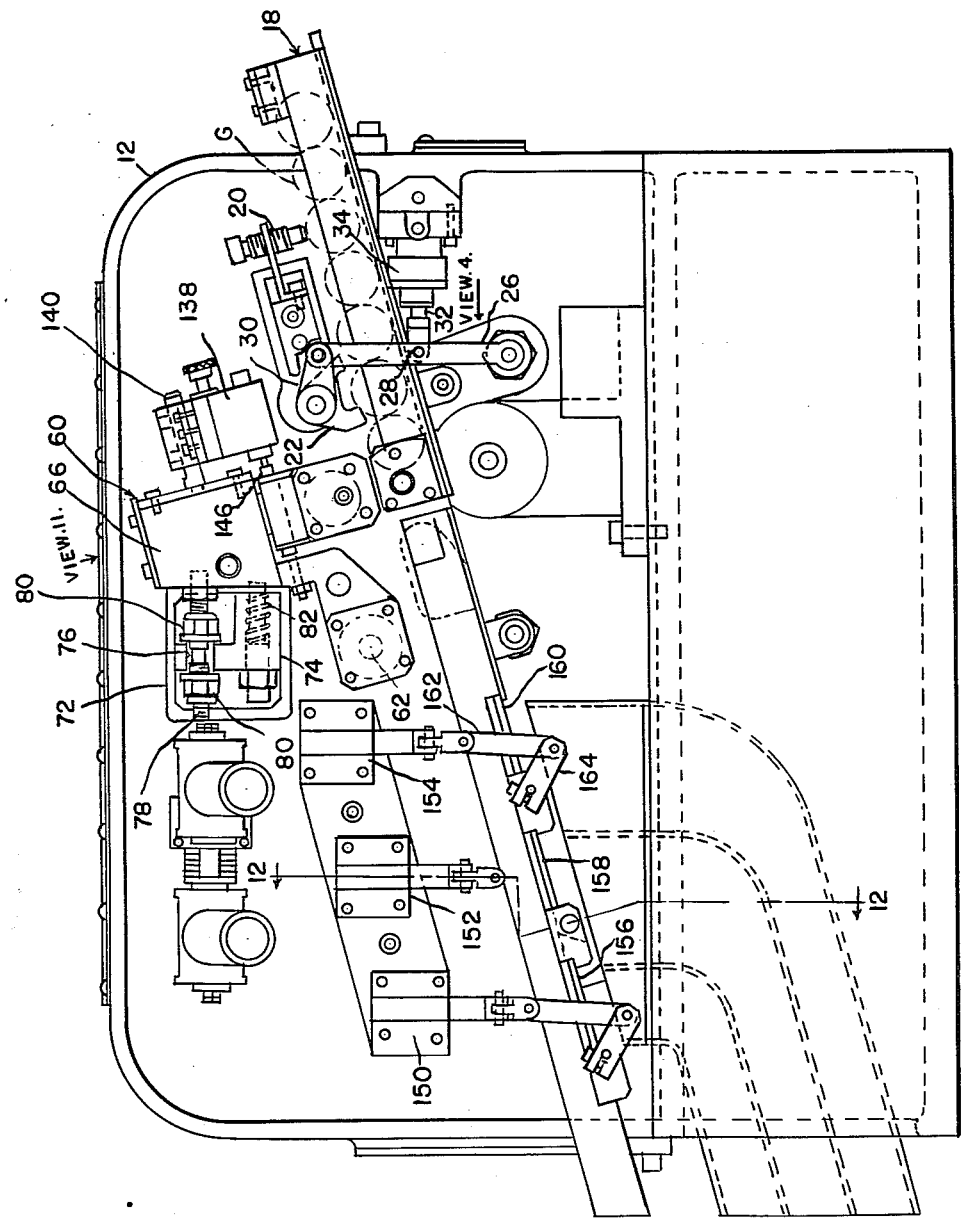
FIGURE 1 is a side elevational view of the gear checkchecking apparatus with portions of the cover removed.

A bracket 72 (FIGURE 1) carries a projection 74 slotted as indicated at 76 to receive a motion limiting pin 78 carrying adjustable abutment nuts 80. The nuts 80 are engageable with opposite sides of the projection to limit rocking movement of assembly 60 about the axis of the stud 62. The projection 74 also carries a compression spring 82 engageable against a side of the bearing housing 66, thus biasing the master gear 50 toward a work gear G interposed between the master gear and the driving gear 36.

The purpose of the friction pin 58 which opposes rotation of the master gear will now become apparent. As a work gear rolls down the chute 18 and engages the rotating driving gear 36, the work gear comes into mesh with both the driving gear and the master gear. If the master gear were freely rotatable the work gear might transmit rotation thereto and never advance into the position in which the axes of the three gears occupy the same plane. However, since rotation of the master gear is opposed by friction, rotation of the work gear due to its meshed relation with the driving gear 36, causes the work gear to walk around the periphery of the stationary master gear until it reaches a centered position with respect thereto.

Means are provided for arresting forward movement of the work gear in a position closely adjacent a centered position between the rotating gear 36 and the master gear 50. This means comprises a stop device shown generally at 84 and best seen in FIGURES 5-8. The stop device comprises an elongated slotted element 86 having a blade 88 therein normally projecting outwardly from the slot in the element 86. The blade is connected to a lever arm 90 which is pivoted as indicated at 92 in a support arm 94. The end of the lever arm 90 opposite the blade 88 is adapted to operate a limit switch LS1 through an actuating plunger 96.

The support arm 90 has means associated therewith for shifting the slotted element 86 laterally of the chute 18 into a stop position in which it engages a work gear G and a retracted position in which it permits free advance of a gear through the chute. The means for effecting the aforesaid movement of the slotted element 86 comprises an air cylinder 98 having a piston therein connected to a piston rod 100 connected by a blade 102 to the support arm 94. As seen in the figures, the air cylinder 98 is adapted for unidirectional operation by air pressure, and a spring 104 which is shown superimposed in FIGURE 5 is connected at one end to the blade 102 and at its other end to the upturned end of an adjustable rod 106 longitudinally adjustable in an apertured post 108 carried by a support panel 110. The blade 102 carries an adjustable switch actuating screw 112 engageable with a limit switch LS2 when the stop assembly 84 is moved to retracted position.

Figure 10:
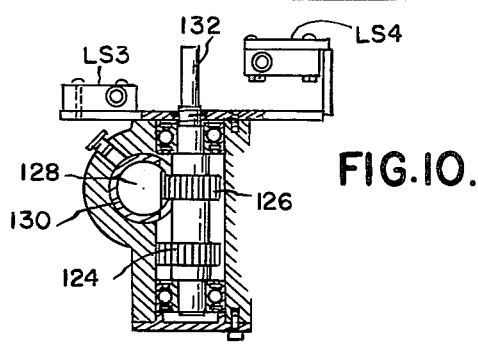
FIGURE 10 is a fragmentary section on the line 10—10, FIGURE 2.

Referring now to FIGURES 2, 3 and 10, means are provided to pick up and rotatably support a work gear G in extremely accurately located position in the working or gauging zone. This means comprises a work support arbor 114 adapted to be advanced through the central opening in a work gear G and to move beyond the gear into supported relation with an outboard support 116. The means for advancing the arbor 114 into operating position comprises an air cylinder 120 having a piston therein connected to a rack 122 meshing with a pinion 124 (see FIGURE 10) formed on a compound gear member including a second pinion 126. The pinion 126 meshes with a rack 128 slidable longitudinally in a tubular guide 130, the rack being connected to the arbor 114. Integral with or rigidly connected to the upper end of the gear on which the pinions 124 and 126 are formed, is a post 132 carrying switch actuating arms 134 adapted to cooperate with limit switches LS3 and LS4 (see FIGURE 3).

The axis of the arbor 114 is so located with respect to the drive gear 36 that when it enters into the central opening of a work gear G, it lifts the work gear slightly from a condition of tight mesh into a condition of backlash or loose mesh with respect to the driving gear. At the same time the lifting movement imparted to the work gear G lifts the master gear pivot support assembly 60. At this time, of course the master gear and work gear are in a condition of tight mesh so that the rotative position of the swivelled master gear support housing assembly 55 is determined by the helix angle or lead of the teeth of the work gear.

Referring now to FIGURE 11 the swivelled assembly 55 is provided with adjustable stops 136 to limit its swivelling movement relative to the pivot support 60. Rigidly carried by the pivot support 60 is a gauging device 138 which is mounted on a post 140 fixed to the bearing housing 66. The gauging device 138 is adjustably connected to the post 140 by screws 142 receivable in clamping relation in elongated slots 144 so that the spacing of the movable fingers 146 of the gauging device is adjustable. In practice, the gauging device is adjusted so that its effective separation from the axis of the swivelled support housing assembly 55 is one inch. With this arrangement the lead error may be read or applied directly in .000"/per inch face width of gear.

The gauging device may be of any suitable type but excellent results are obtained when a linear variable differential transformer type indicator is employed such for example as sold by the Cleveland Instrument Company of Cleveland, Ohio.

The gauging device actuates control circuits for solenoids 150, 152, and 154, each of which its plunger connected to a gate 156, 158, and 160 by a link 162 connected to an actuating arm 164. The gauging device 138 may be used solely to control the gate so as to separate the gears into appropriate categories or it may be connected to a suitable indicator. If an indicator is employed it is desirable in some cases to record the results of the check of only a limited number of gears. If this type of recording is employed one of the gates, as for example the gate 156 associated with the solenoid 150, may separate the recorded gears into a separate group for comparison with the recorded charts. Gate 158, associated with solenoid 152 may be actuated to separate gears which are off-helix to the right, while gate 160, associated with solenoid 154 may separate gears which are off-helix to the left. Gears which are within the acceptable range of tolerance of helix angle pass along the chute 18 and are not separated.

With the foregoing general description of the mechanism in mind the operation will be briefly reviewed. Assume that a sequence of gears G in the chute 18 so that a gear is adjacent the proximity pick up control unit or device 20, and assume that a gear has just been gauged and released for movement along the chute from the gauging zone. The release of the gauged gear from the gauging zone was accomplished by retraction of the arbor 114 and when this arbor reaches its fully retracted position limit switch LS4 is actuated by lever 134. Actuation of limit switch LS4, assuming that the proximity pick up device 20 is adjacent a gear, actuates the cylinder 34 in a forward and reverse stroke, thus rocking the gear retainer 22 and releasing a single gear from the sequence of gears in the chute. This gear rolls forwardly until it engages both the driving gear 36 and the master gear 50 at which time it walks around the stationary master gear until it engages the blade 88 of the stop assembly 84, thus actuating the limit switch LS1. While the gear is retained against the stop assembly 84, it is positively driven in rotation and its rotation overcomes the resistance to rotation of the master gear which thereupon commences to rotate.

Actuation of the limit switch LS1 admits air to the cylinder 120 which advances the arbor 114 into position in the gear. The arbor picks the gear up out of tight mesh with the driving gear and retains it in tight mesh with the master gear which is thereupon swivelled to a position dependent upon any helix angle error in the gear being checked. When the arbor reaches its fully extended position limit switch LS3 is actuated which controls the admission of fluid to the cylinder 98, thus retracting the stop assembly 84. When the stop assembly 84 reaches its fully retracted position limit switch LS2 is actuated, which starts a timing cycle by a timing device (not shown) set to time an interval which insures a full 360 degrees' rotation of the work gear. It also commences actuation of the LVDT indicator. When the timing interval times out air supply to the cylinder 120 is controlled to retract the arbor. As soon as the arbor is withdrawn from the hole in the gear, the gear is positively moved through the gauging zone and rolls down the chute where it is separated from good gears if it has an unacceptable helix angle error or if a record has been made of its variation in lead or helix angle. Complete retraction of the arbor again actuates the limit switch LS4, thus starting a new gear through its gauging cycle. The operation continues so long as a supply of gears remains in the chute but is terminated in the first instance by absence of a gear adjacent the proximity pick up device 20.

The drawings and the foregoing specification constitute a description of the improved automatic gear gauging apparatus in such full, clear, concise and exact terms as to enable any person skilled in the art to practice the invention, the scope of which is indicated by the appended claims.

What I claim as my invention is:

1. A gear checker comprising a rotary drive gear, a master gear having its axis substantially parallel to said drive gear and spaced therefrom to provide for passage of a work gear therebetween, a support for said master gear movable toward and away from said drive gear, means for advancing work gears into engagement with said drive and master gears, a brake operatively connected to said master gear to oppose rotation thereof, said work gear, as a result of rotation of said drive gear, rolling over said master gear, means for arresting each work gear between said drive and master gears, the arresting of said work gear forcing rotation of said master gear against the resistance of said brake, an accurate locating rotary support movable into engagement with said work gear while between said master and drive gears, and means for measuring movement of said master gear during rotation of said work gear.

2. An automatic gear checker comprising a chute for advancing work gears, a rotary drive gear below said chute mounted in fixed position to engage in tight mesh with the underside of a work gear, means to rotate said drive gear, a master gear above said chute opposite said drive gear and in position to enter into tight mesh with a work gear, means mounting said master gear for movement toward and away from said drive gear, a retractable stop engageable by a work gear upon movement thereof into position intermediate said drive and master gears and in tight mesh with both of said drive and master gears, an arbor movable axially and transversely of said chute to pick up a work gear engaging said stop, said arbor being located in position such that axial movement thereof into engagement with the work gear moves the work gear from tight mesh into loose mesh with said driving gear, and means for measuring movement of said master gear incident to its rotation by the work gear.

3. An automatic gear checker comprising a guideway along which a series of work gears to be checked is movable, a rotary drive gear at one side of said guideway in fixed position to mesh in tight mesh with a work gear moved along said guideway, means to rotate said drive gear, a master gear at one side of said guideway opposite said drive gear in position to mesh in tight mesh with a work gear moved along said guideway, means mounting said master gear for movement toward and away from said drive gear, a retractable stop engageable by a work gear upon movement thereof into tight meshed engagement with said driving and master gears, an arbor movable axially and transversely of said guideway to pick up and support a work gear engaging said stop, said arbor being located in a position such that axial movement thereof into engagement with said work gear moves the work gear engaged thereby from tight mesh into a position of loose mesh with respect to said drive gear, and means for measuring movement of said master gear incident to its rotation by the work gear.

4. A gear checker as defined in claim 3 comprising means for advancing and retracting said arbor, means responsive to engagement of said retractable stop by a work gear to initiate advance of said arbor, and means responsive to completion of advance movement of said arbor to retract said retractable stop.

References Cited in the file of this patent

UNITED STATES PATENTS

| | | |
|---|---|---|
| 1,233,014 | Baker | July 10, 1917 |
| 2,318,970 | Richmond | May 11, 1943 |
| 2,761,560 | Pomernacki | Sept. 4, 1956 |
| 2,785,799 | Esken | Mar. 19, 1957 |
| 2,803,342 | Gates | Aug. 20, 1957 |
| 2,815,579 | Bassoff | Dec. 10, 1957 |
| 2,877,895 | Drader | Mar. 17, 1959 |
| 2,905,320 | Gates | Sept. 22, 1959 |
| 2,944,343 | Anthony | July 12, 1960 |
| 2,959,282 | Pomernacki | Nov. 8, 1960 |